May 16, 1967  H. O. EARLY ETAL  3,319,605
TRAINING DEVICE FOR MAINTAINING A TAUT
LARIAT ON A ROPING HORSE

Filed July 8, 1965  2 Sheets-Sheet 1

Hallie O. Early
Kenneth R. Schafer
Herman R. Kirkland
INVENTORS

BY Clarence A. O'Brien
and Harvey B. Jacobson
Attorneys

May 16, 1967
H. O. EARLY ETAL
3,319,605
TRAINING DEVICE FOR MAINTAINING A TAUT
LARIAT ON A ROPING HORSE
Filed July 8, 1965
2 Sheets-Sheet 2
Fig. 3
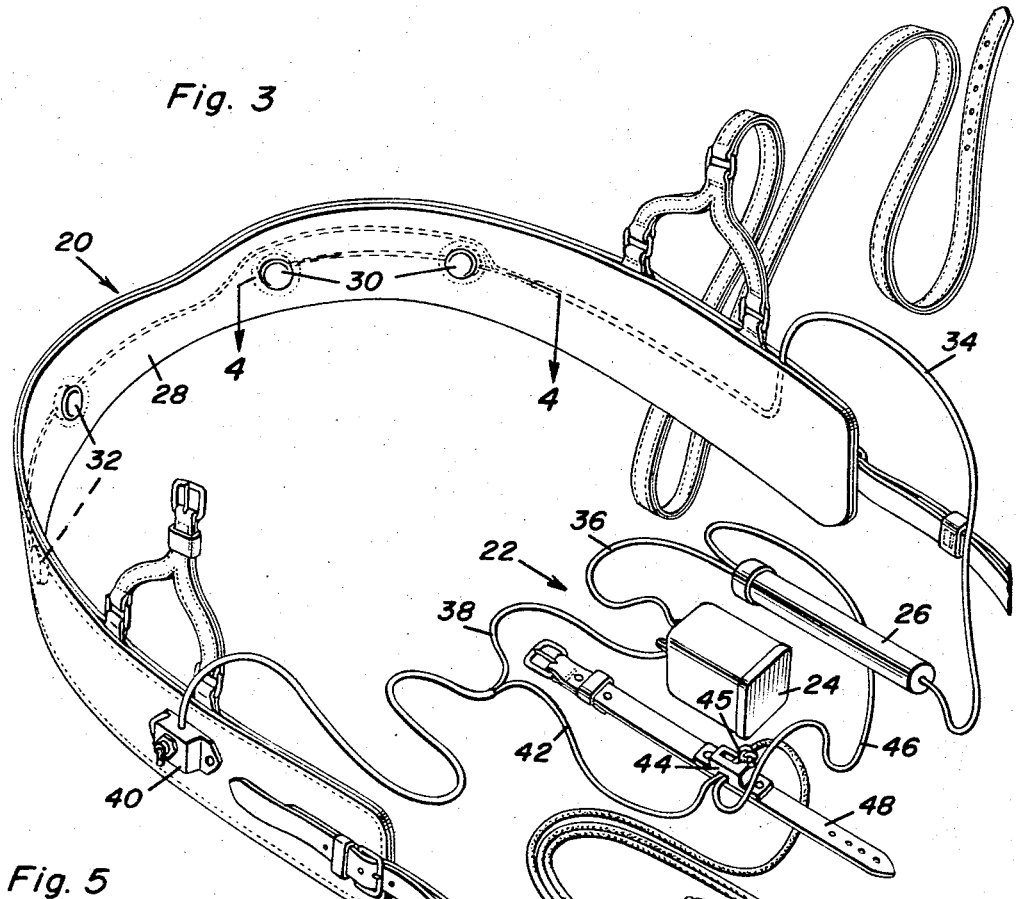
Fig. 5
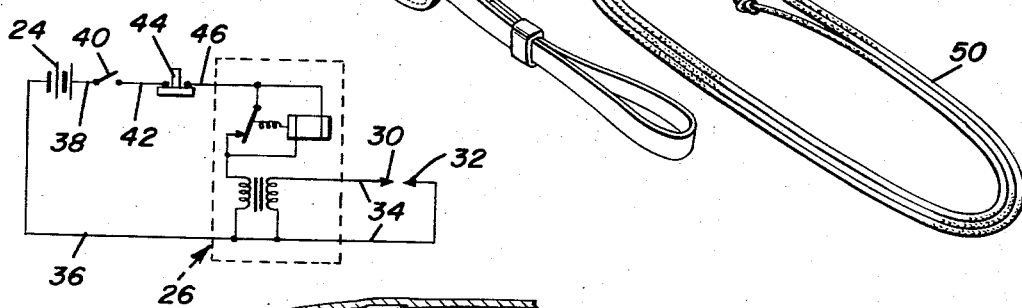
Fig. 4
Hallie O. Early
Kenneth R. Schafer
Herman R. Kirkland
INVENTORS
BY Clarence A. O'Brien
and Harvey B. Jackson
Attorneys _United States Patent Office_

3,319,605
Patented May 16, 1967

3,319,605
TRAINING DEVICE FOR MAINTAINING A TAUT LARIAT ON A ROPING HORSE
Hallie O. Early, 1407 Avenue E, Kenneth R. Schafer, 4001 Austin Ave., and Herman R. Kirkland, 3901 Austin Ave., all of Brownwood, Tex. 76801
Filed July 8, 1965, Ser. No. 470,466
3 Claims. (Cl. 119—29)

This invention relates to an animal training device and more particularly to a device adapted to be used to train a horse for working cattle and for rodeo purposes by teaching the horse to maintain a taut lariat when engaged in calf roping and tying.

In training a horse for working cattle and for rodeo purposes it is extremely important that after a calf is roped that the horse maintain constant tension on the lariat tied to the saddle horn, the other end of which is around the calf. A well trained horse capable of keeping constant tension on a lariat during roping and tying of the calf is an extremely valuable animal and commands high prices on the open market. As is well known, the constant tension maintained on the lariat by the horse enables the cowboy or roper to quickly get to the lassoed calf and throw and tie it securely in a minimum of time.

Accordingly, it is an object of this invention to provide an animal training device which will aid in teaching a horse to maintain a lariat taut during the roping and tying of a calf when there is no rider in the saddle to operate the reins.

It is another object of this invention to provide an animal training device which may be readily mounted on a conventional saddle, and harness breast strap.

Still another object of this invention is to provide an electrically powered device which is operated by the degree of tension maintained on the rope which is secured to the saddle horn and passes around the calf.

A further object of this invention is to provide a simple, and efficient electric shock training device which is economical to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged perspective view of the animal training device of the present invention showing the component parts thereof; and FIGURE 4 is a fragmentary sectional view of the breast strap of FIGURE 3 taken substantially along the plane of the line 4—4 of FIGURE 3, further showing the placement of a plurality of electrical body contact members.

FIGURE 5 is a schematic diagram of the electrical circuit of the device of the present invention.

Figure 1:
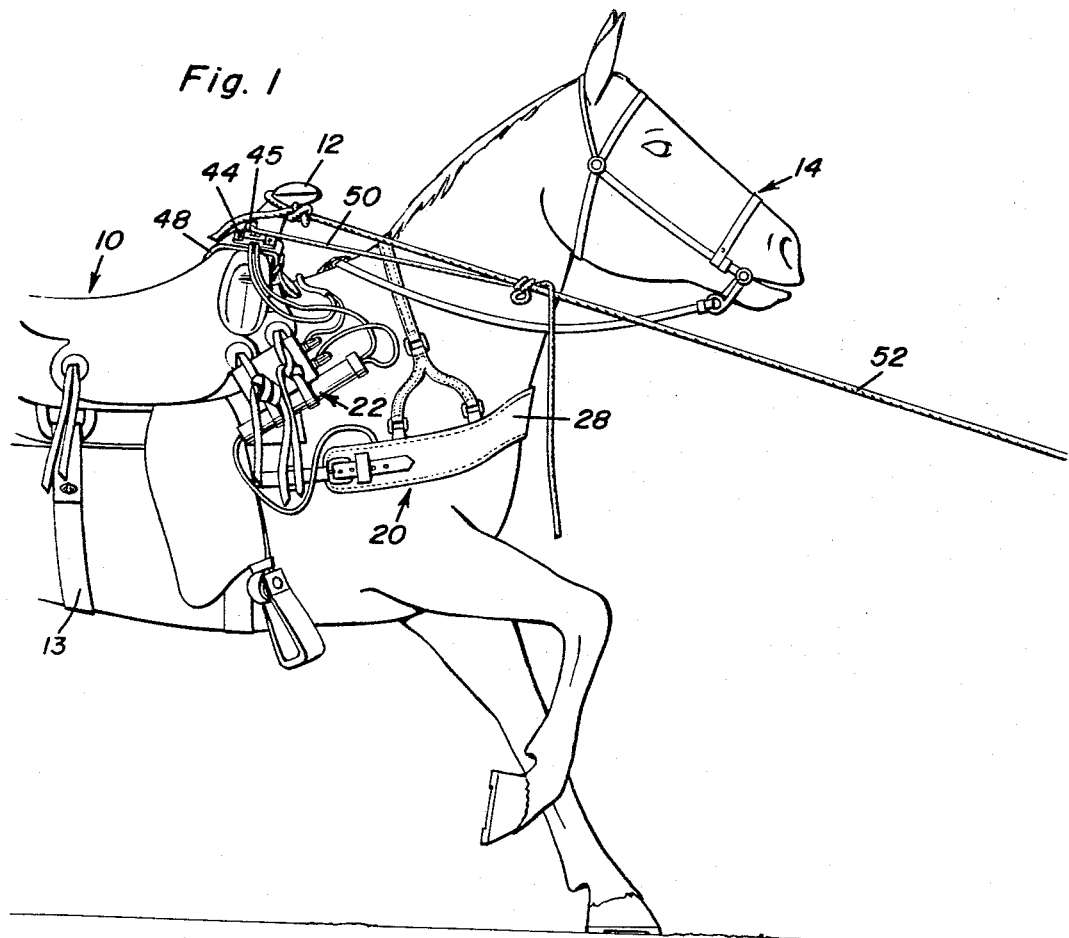
FIGURE 1 is a side view of a horse equipped with a conventional saddle, bridle and breast strap illustrating the device of the present invention carried by the breast strap.
Figure 2:
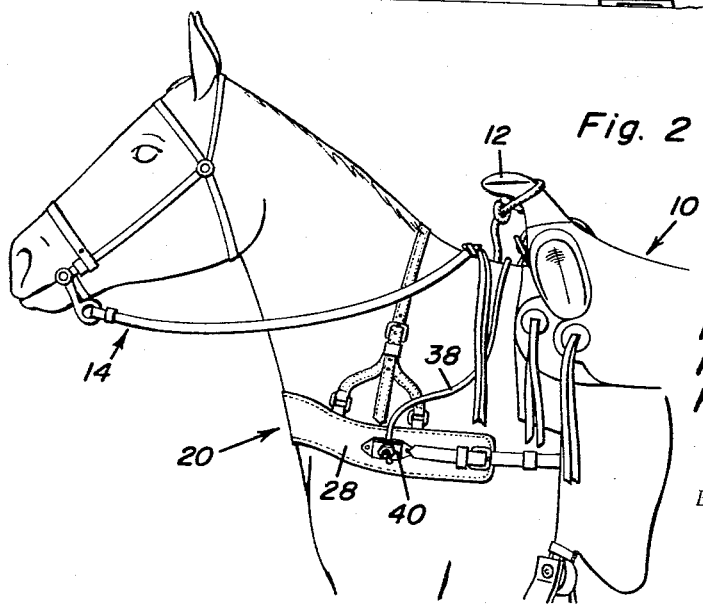
FIGURE 2 is a side view of the horse of FIGURE 1 as seen from the side opposite that illustrated in FIGURE 1.

Referring now to the drawings and FIGURES 1 and 2 in particular, it may be seen that the horse is equipped with a conventional saddle indicated generally at 10, which is provided with a saddle horn 12 and a cinch 13. The horse is further provided with the usual bridle indicated generally at 14.

The training device comprising the present invention is indicated generally at 20 and includes a selectively operable high voltage low amperage electrical shocking means, a portion of which is indicated generally at 22. The portion 22 of the electrical shocking means includes a battery 24 and a transformer-vibrator unit 26 which may be secured to the saddle 10 by means of a pair of latigo tie straps which are conventionally provided on Western type saddles.

A conventional breast collar 28, supported by suitable straps from the cinch is provided with two pairs of grounding, or contact electrodes 30 and 32 by sandwiching the electrodes between the lamina of the breast strap as seen best in FIGURE 4 with the electrodes projecting inwardly through suitable apertures in the inner lamina of the breast strap thereby permitting the electrical contacts 30 and 32 to come into conductive contact with the horse when the breast collar is placed upon the horse as seen in FIGURES 1 and 2. A conductive path between the transformer-vibrator unit 26 and the pairs of electrodes 30 and 32 is provided by the insulated plural conductor wires 34.

One terminal of the battery 24, which is preferably of a dry cell type, is connected by a suitable insulated conductor to the transformer-vibrator unit 26. The other terminal of the battery 24 is likewise connected to the transformer-vibrator unit 26 by a suitable insulated conductor 38 an on-off or master switch 40, insulated conductor 42, spring biased normally closed switch 44 and insulated conductor 46.

A schematic diagram of the electrical circuit is illustrated in FIGURE 5.

The master switch 40 is preferably secured to the breast strap by suitable means such as rawhide strips, for example, and the spring biased normally closed switch 44 is preferably secured by rivets or the like to a strap 48 which is preferably secured by buckling it to the saddle 10 at the base of the horn 12 in the position seen best in FIGURE 1.

Referring to FIGURES 3 and 5 it may therefore be seen that when the master switch 40 is in the on position and the spring biased switch 44 is in its normally closed position the transformer-vibrator unit 26 will be energized thereby transforming the low voltage current provided by the battery 24 into a pulsating high voltage low amperage current which is fed to the respective electrodes pairs 30 and 32 to impart a shock to the horse. If, however, the switch 44 is moved from the normally closed to an open position it will be understood that the conductive path from the battery 24 to the transformer-vibrator unit 26 will be interrupted.

A line 50 is provided as a means of operating the spring biased normally closed switch 44 by virtue of the tension on the roping line 52. Accordingly, one end of the line 50 is secured to the operating means 45 of the switch 44, as seen best in FIGURE 3. The other end of line 50 is then secured to the line 52 adjacent but in spaced apart relation from the horn 12 while maintaining the line 52 in a taut condition. The line 50 may be secured about the line 52 with a suitable knot. With the line 50 taut the switch 44 is in the off position. Accordingly, it may therefore be seen that as long as the rope 52 and the line 50 are maintained in a taut condition the contact of the switch 48 will remain open thereby breaking the circuit between the battery 24, transformer-vibrator 26 and electrical contacts 30 and 32. If, however, the line 52 with the line 50 secured thereto as illustrated in FIGURE 1 is permitted to slacken the switching means 45 of the switch 44 will be permitted to return to the normally closed position thereby completing the circuit between the battery 24, transformer, vibrator 26, and the electrical contacts 30 and 32 thereby subjecting the horse to electrical shock.

Upon receiving such shock, which shock is disturbing but not harmful to the animal, the horse rears backwardly due to the placement of the electrical contacts 30 and 32 across the horse's breast, thereby drawing the line 52 taut. This in turn tensions the line 50 which in turn moves the operating means 45 and switch 44 to open the contact of the switch 44 thereby interrupting the circuit from the battery through the transformer-vibrator 26 and the electrical contacts 30 and 32 regardless of the position of the switch operating means 45 of the switch 44.

After utilization of the harmless device of this invention a horse rapidly becomes conditioned to maintain the roping line in a taut condition thereby enabling the cowboy or roper to quickly get to a roped calf and throw and tie it securely.

It may therefore be seen that there has been provided an animal training device which is simple in construction and highly efficient for the use for which it is intended. Although the present training device has been illustrated and described in connection with the training of a horse utilized in roping, it will be understood that this device lends itself to other adaptations in that an animal may be trained not to pull on a rope or chain by providing a switch which will close and give a shock when tension is put on a rope rather than when tension on a rope is released such as is the case with the switch 44. With an application of this nature the shocking electrodes would preferably be placed at the rear of the animal so that it will dart forward upon tensioning of the rope and subsequent shocking and relieve the tension on the rope or chain.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed is as follows:

1. In combination with a saddle a training apparatus for training a horse to maintain a taut lariat during the throwing and tying of a calf without interfering with the horse's normal bridle accoutrements which training apparatus comprises an electrically energized battery-powered high tension shocking means for attachment to the saddle including battery means, grounding means substantially carried by the saddle independent of the normal bridle accoutrements, said grounding means normally conductively connecting portions of said shocking means to the horse, said shocking means including a normally conductive spring biased switch means carried by the saddle and interposed in a conductive path between said battery means and said grounding means, a lariat having one end attached to the saddle and the other end for engaging an animal to be lassoed, means connecting said spring biased switch to said lariat intermediate its ends, said switch means being operable by said lariat whereby when tension is placed on said lariat by the horse during the roping of an animal said spring biased switch will be urged into an off position thereby interrupting the shocking current so as to condition the horse to maintain a taut lariat without requiring a person in the saddle to manipulate the normal bridle accoutrements.

2. The combination of claim 1 wherein said grounding means includes a breast collar adapted to be supported on the horse substantially from the saddle in contact with the horse's breast, said breast collar provided with at least one electrode adapted to be in conductive contact with the horse.

3. The combination of claim 1 wherein said shocking means is provided with an on-off switch means to prevent de-energization of the shocking means regardless of the condition of said spring biased switch.

References Cited by the Examiner

UNITED STATES PATENTS

| | | | |
|---|---|---|---|
| 987,345 | 3/1911 | Cogswell | 54—1 |
| 2,741,224 | 4/1956 | Putnam | 119—29 |
| 2,800,104 | 7/1957 | Cameron et al. | 119—29 |
| 2,821,960 | 2/1958 | Rudolph | 119—29 |
| 2,830,556 | 4/1958 | Grams | 119—29 |
| 3,161,005 | 12/1964 | Ackerson | 54—71 |

SAMUEL KOREN, *Primary Examiner.*

ALDRICH F. MEDBERY, *Examiner.*